(12) United States Patent
Symes et al.

(10) Patent No.: US 6,504,495 B1
(45) Date of Patent: Jan. 7, 2003

(54) CLIPPING DATA VALUES IN A DATA PROCESSING SYSTEM

(75) Inventors: Dominic Hugo Symes, Cherry Hinton (GB); Wilco Dijkstra, Cherry Hinton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/251,410

(22) Filed: Feb. 17, 1999

(51) Int. Cl.[7] .................................................. H03M 7/00
(52) U.S. Cl. ........................... 341/95; 341/96; 341/102; 341/103; 712/241; 712/226; 712/36; 712/34; 712/200; 712/9; 712/212; 712/210; 712/217; 712/220; 712/225; 712/35; 345/505; 345/563; 345/807
(58) Field of Search ............................. 341/95, 96, 94, 341/102, 103; 712/210, 212, 226, 220, 235

(56) References Cited

U.S. PATENT DOCUMENTS

| | | | | |
|---|---|---|---|---|
| 5,283,577 A | * | 2/1994 | Coenen | 341/95 |
| 5,363,098 A | * | 11/1994 | Antoshenkov | 341/95 |
| 5,387,911 A | * | 2/1995 | Gleichert et al. | 341/95 |
| 5,410,300 A | * | 4/1995 | Gould et al. | 340/2.2 |
| 5,477,222 A | * | 12/1995 | Kahlman et al. | 341/95 |
| 5,486,828 A | * | 1/1996 | Mikami | 341/95 |
| 5,574,952 A | * | 11/1996 | Brady et al. | 341/95 |
| 5,784,602 A | * | 7/1998 | Glass et al. | 712/220 |
| 5,901,301 A | * | 5/1999 | Matsuo et al. | 712/212 |
| 6,002,881 A | * | 12/1999 | York et al. | 712/225 |
| 6,009,512 A | * | 12/1999 | Christie | 712/226 |
| 6,055,619 A | * | 4/2000 | North et al. | 712/36 |
| 6,260,088 B1 | * | 7/2001 | Gove et al. | 712/35 |

* cited by examiner

Primary Examiner—Don Phu Le
Assistant Examiner—Lam T. Mai
(74) Attorney, Agent, or Firm—Nixon & Vanderhye P.C.

(57) ABSTRACT

A clipping and quantization technique is described for producing clipped numbers in a range of 0 to N−1 (from unclipped numbers in a range of −0.5N to (1.5N−1)), where N is $2^m$ and m is the bit length of the desired clipped and quantized number. The most significant bit of the unclipped data value indicates whether an overflow of the permitted range has occurred and that clipping is required. The next most significant bit ($m-1^{th}$) indicates which saturated value should be adopted. These properties of the unclipped data value may be exploited to generate the desired clipped and quantized numbers using logical left shifting and conditionally executed saturating instructions executing upon a general purpose processor 24. The shifting operations performed to achieve saturation operation may simultaneously yield quantization.

17 Claims, 4 Drawing Sheets

00000000 00000000 00000001 01111111 = 383

00000000 00000000 00000001 00000001 = 257
00000000 00000000 00000001 00000000 = 256
00000000 00000000 00000000 11111111 = 255
00000000 00000000 00000000 11111110 = 254

00000000 00000000 00000000 00000001 = 1
00000000 00000000 00000000 00000000 = 0
11111111 11111111 11111111 11111111 = -1
11111111 11111111 11111111 11111110 = -2

11111111 11111111 11111111 10000000 = -128

CLIPPING DATA VALUES IN A DATA PROCESSING SYSTEM

BACKGROUND OF THE INVENTION

1. Field of the Invention

This invention relates to data processing systems. More particularly, this invention relates to techniques for clipping data values within data processing systems such that the resulting data values lie within a predetermined range with data values originally outside that range being modified to a data value of the respective boundary of the permitted range to which they are closest.

2. Description of the Prior Art

The need to clip data values within data processing systems is widespread. Examples of situations in which clipping is needed are the processing of signal data (e.g. image or audio) that may be captured (e.g. by a camera or a microphone) or decoded from another source (e.g. an MPEG data stream or a JPEG image). A characteristic of the situations is which clipping is often required is that large volumes of data need to be processed. As an example, a single image frame may contain millions of pixel values all of which may need to be clipped. Accordingly, the data processing resources that are consumed by clipping can be considerable and measures that can make the clipping process more efficient are highly advantageous.

SUMMARY OF THE INVENTION

Viewed from one aspect the present invention provides apparatus for processing an unclipped data value in a range of $-0.5N$ to $(1.5N-1)$ to generate a clipped data value clipped to a range of 0 to $(N-1)$, where N is $2^m$ said unclipped data value is represented by an overflow bit followed by an m-bit number extending from an $(m-1)^{th}$ bit to a $0^{th}$ bit and said unclipped data value is part of an n-bit twos complement input data word, said apparatus comprising:

left shifting logic for left shifting said unclipped data value to generate a left shifted data value in which said $(m-1)^{th}$ bit is a most significant bit in said left shifted data value and a carry flag is set in dependence upon said overflow bit;

saturated value generating logic for generating said clipped data value in accordance with:

said clipped data value is 0 if said carry flag indicates that said overflow bit was 1 and said most significant bit in said left shifted data value is 1;

said clipped data value is $(N-1)$ if said carry flag indicates that said overflow bit was 1 said most significant bit in said left shifted data value is 0; and said clipped data value is said m-bit number if said carry flag indicates that said overflow bit was 0.

The invention recognises that in many practical cases the values are being clipped such that they can be represented by a binary number with a fixed number of bits and the degree of overflow from the permitted range in many cases will not exceed half of the width of the permitted range at either extreme. In these circumstances, the numbers being clipped display the property that the most significant bit will be an overflow bit representing whether any clipping is needed and, if there is an overflow, the next most significant bit will give an indication of to which of the saturated values of the permitted range the number should be modified. The recognition of these properties allows highly efficient clipping to be achieved by a combination of left shifting and substitution with a saturated value conditional upon an overflow occurring using a saturated value selected in dependence upon the most significant bit of the shifted number.

It will be appreciated that the unclipped data value may be embedded within a larger number with quantization and alignment being required as well as clipping, e.g. the raw input words could be 8-bit plus sign numbers in the range $-128$ to 383 that effectively contain embedded unclipped data values of $-16$ to 47 that require clipping to the range 0 to 31.

Improving the efficiency of a clipping operation even by a small degree is highly advantageous when that clipping operation must in practice be executed a large number of times on a set of data such that the gains each time a value is clipped accumulate to produce a significant reduction in total processing load.

The type of data that requires clipping often also requires quantization. The shifting and saturated value generation operations used to clip the data value may be modified with, for example, the use of appropriate masks to simultaneously achieve quantization without any additional processing steps being required.

Whilst it will be appreciated that special purpose hardware could be provided for performing the clipping techniques of the invention, the invention is particularly well suited for use with general purpose processor units operating under software control as such systems typically have the shifting and logical combination instructions that may be used to implement the invention.

In preferred embodiments of the invention said left shifting and said quantization is provided by said processor unit executing a first instruction giving a result of a logical AND operation with input operands of a logically left shifted version of said n-bit input data value and a mask value having its m most significant bits set to 1 and at least its (n−m) next most significant bits set to 0, said first instruction yielding a left shifted and quantized intermediate value.

Such a logical AND operation using a shifted input operand is able to detect the overflow, place the most significant bit of the data value indicating the direction of the overflow in a known position and quantize the data all in one processing step.

In preferred embodiments of the invention generation of said clipped value is provided by said processor unit conditionally executing a second instruction if said carry flag indicates said overflow bit is 1, said second instruction giving the result of a bit clear operation with input operands of an arithmetically right shifted by (m−1) bit positions version of said left shifted and quantized intermediate value and said mask value, said bit clear operation giving a result of said mask value AND NOT said arithmetically right shifted by at least (m−1) bit positions version of said left shifted and quantized intermediate version to yield said clipped value.

The conditional execution of the second instruction responds to whether or not an overflow has taken place and the arithmetic right shift with a logical AND NOT serves to saturate the value to the correct extreme.

The clipped values may often be a component value and in these circumstances preferred embodiments of the invention may combine component values to form a composite value using a logical OR together with logical right shifting.

As previously mentioned the unclipped data value could represent many different forms of data. However, the invention is particularly well suited to the clipping of image data values as these frequently require clipping and when this is the case there is typically a large number of values requiring clipping and so the efficiency gains of the invention yield greater benefits.

A particularly frequently occurring problem is the processing of decompressed data values obtained following a lossy compression process. Lossy compression, such as JPEG or MPEG compression, is good at achieving high degrees of compression but has the disadvantage that when the data is decompressed sometimes the data values generated lie outside of the predetermined range and require clipping. These circumstances are also often ones in which the degree to which the data values lying outside the permitted range is limited to less than half the span of the predetermined range and so the present invention may be used to considerable advantage.

Viewed from another aspect the present invention provides a computer program storage medium bearing a computer program for controlling a data processing apparatus to perform a method of processing an unclipped data value in a range of $-0.5N$ to $(1.5N-1)$ to generate a clipped data value clipped to a range of 0 to $(N-1)$, where N is $2^m$, said unclipped data value is represented by an overflow bit followed by an m-bit number extending from an $(m-1)^{th}$ bit to a $0^{th}$ bit and said unclipped data value is part of an n-bit twos complement input data word, said method comprising the steps of:

left shifting said unclipped data value to generate a left shifted data value in which said $(m-1)^{th}$ bit is a most significant bit in said left shifted data value and a carry flag is set in dependence upon said overflow bit;
generating said clipped data value in accordance with:
said clipped data value is 0 if said carry flag indicates that said overflow bit was 1 and said most significant bit in said left shifted data value is 1;
said clipped data value is $(N-1)$ if said carry flag indicates that said overflow bit was 1 and said most significant bit in said left shifted data value is 0; and
said clipped data value is said m-bit number if said carry flag indicates that said overflow bit was 0.

Viewed from a further aspect the present invention provides a method of processing an unclipped data value in a range of $-0.5N$ to $(1.5N-1)$ to generate a clipped data value clipped to a range of 0 to $(N-1)$, where N is $2^m$, said unclipped data value is represented by an overflow bit followed by an m-bit number extending from an $(m-1)^{th}$ bit to a $0^{th}$ bit and said unclipped data value is part of an n-bit twos complement input data word, said method comprising the steps of:

left shifting said unclipped data value to generate a left shifted data value in which said $(m-1)^{th}$ bit is a most significant bit in said left shifted data value and a carry flag is set in dependence upon said overflow bit;
generating said clipped data value in accordance with:
said clipped data value is 0 if said carry flag indicates that said overflow bit was 1 and said most significant bit in said left shifted data value is 1;
said clipped data value is $(N-1)$ if said carry flag indicates that said overflow bit was 1 and said most significant bit in said left shifted data value is 0; and
said clipped data value is said m-bit number if said carry flag indicates that said overflow bit was 0.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
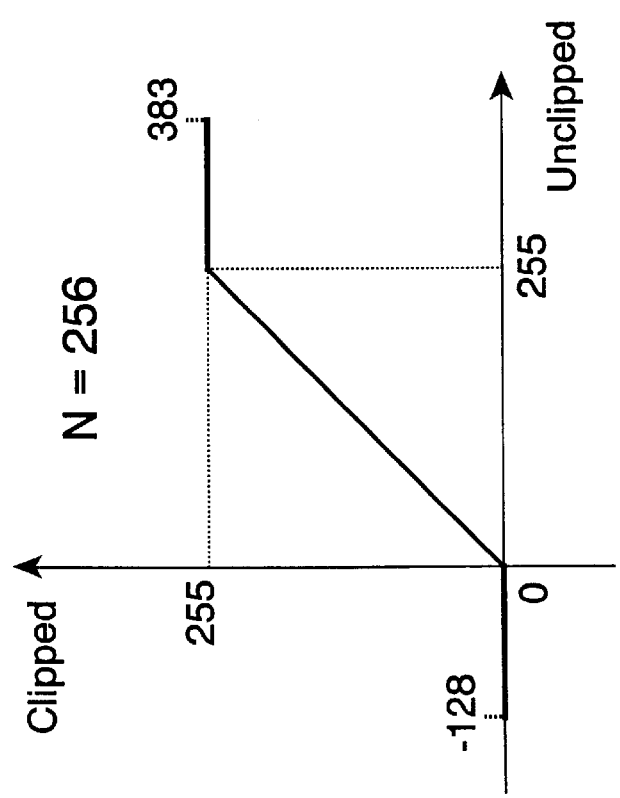
FIG. 1 illustrates the clipping of data values such that they lie within a predetermined range.

FIG. 1 illustrates the relationship between unclipped data values and clipped data values in one circumstance. In the illustration of FIG. 1 the clipped data value is to be represented by an 8-bit number and accordingly has a permitted range of 0 to 255. The input unclipped data value is such that it is known that it lies within a range of $-128$ to 383 (i.e. $-0.5*256$ to $((1.5*256)-1)$). In practice many lossy compression systems are such that when the data is decompressed the data values produced will have this property.

As illustrated, if an unclipped value lies within the range 0 to 255, then it is unaltered by the clipping process. If an unclipped data value is in the range of 256 to 383, then it will be replaced with a value of 255. If an unclipped data value is in the range of $-128$ to $-1$, then it will be replaced with a value of 0. In this example the saturated value at the maximum end of the permitted range is 255 and the saturated value at the minimum end of the permitted range is 0. No quantization is performed in the example of FIG. 1.

Figure 2:
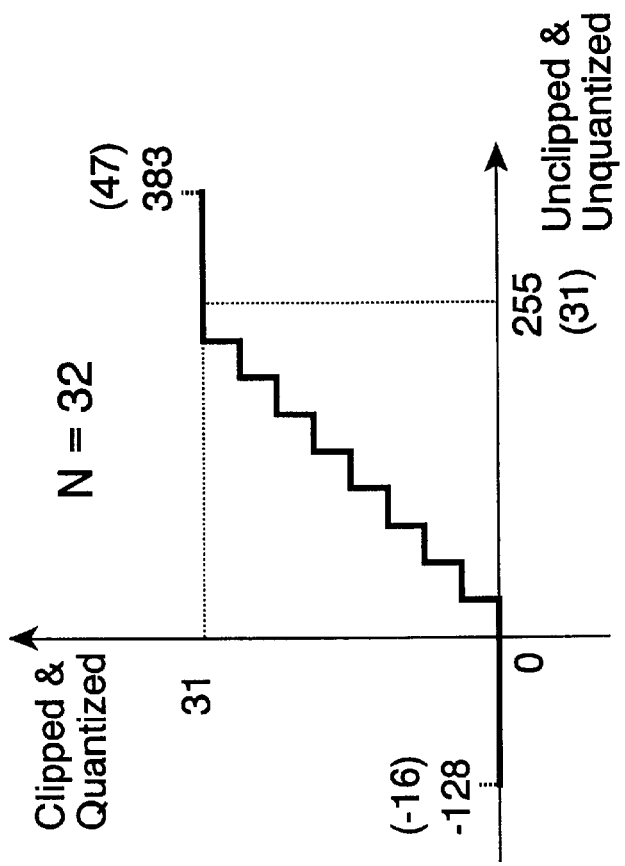
FIG. 2 illustrates the clipping and quantization of data values such that they lie within a predetermined range and are quantized to values that may be presented by fewer bits than the input data values.

FIG. 2 illustrates the relationship between unclipped data values and clipped and quantized data values. In this case unclipped and unquantized data values lie in the range $-128$ to 383 with the embedded unclipped data values lying in the range of m–16 to 47. The clipped data values are also to be quantized such that they can be represented by 5-bit numbers. Thus, the clipped and quantized values will lie in the range 0 to 31. Unclipped data values in the range 0 to 7 will be quantized to a value of 0. Unclipped data values in the range 8 to 15 will be quantized to the value 1. This quantization proceeds throughout the permitted range. Unclipped data values in the range 256 to 383 are clipped and quantized to a value of 31. Unclipped data values in the range $-16$ to $-1$ are clipped and quantized to a value of 0. The unclipped data values can be aligned in different positions within the input data words.

Figures 3, 4:
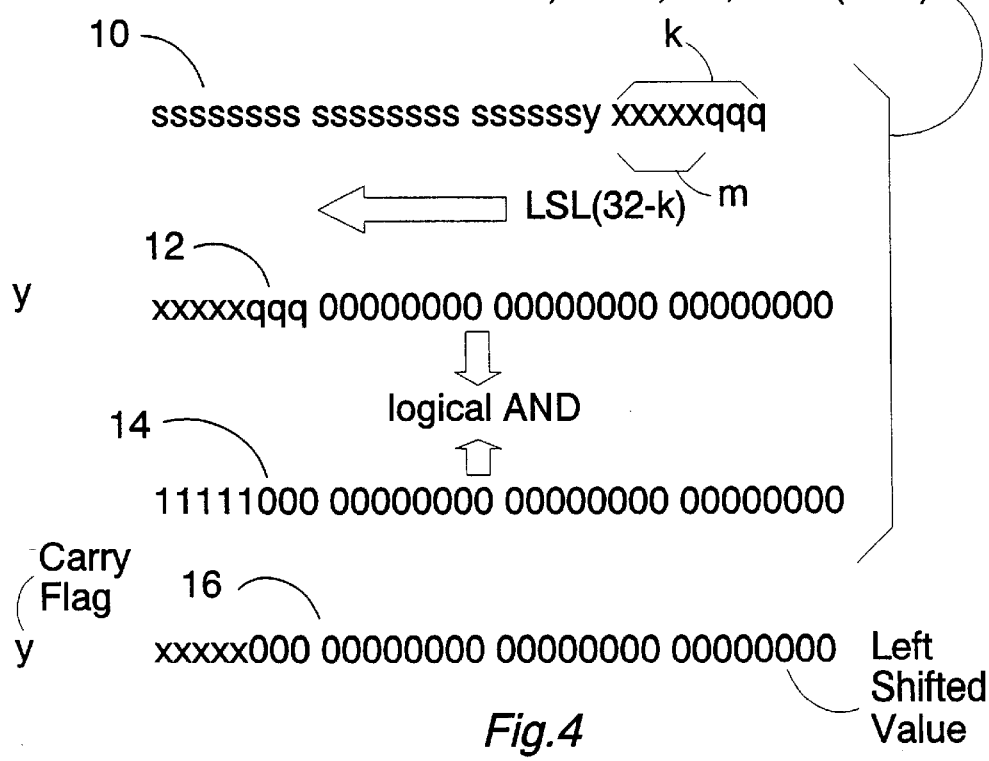
FIG. 3 illustrates a range of binary numbers that may be input values and which require clipping.
FIG. 4 illustrates a logical left shift and masking operation.

FIG. 3 illustrates a range of unclipped data values as shown in FIGS. 1 and 2. It can be seen from FIG. 3 that numbers in the range 0 to 255 are represented by the 0th to the 7th bit of the unclipped data value with all the higher order bits being 0. For the unclipped data values in the range 256 to 383 the 8th bit is a 1 and the 7th bit is a 0. The 8th bit corresponds to an overflow bit and indicates that the value needs to be clipped. The 7th bit being a 0 indicates that the saturated value to be used is 255. At the other end of the range unclipped data values lying between $-128$ and $-1$ have an 8th bit of 1 indicating an overflow and that clipping is required. The 7th bit for all of these values is a 1 and this indicates that the saturated value to be used is 0. For the negative unclipped data values the higher order bits above the 8th bit are all 1 indicating the negative sign (i.e. a twos complement representation).

Figure 5:
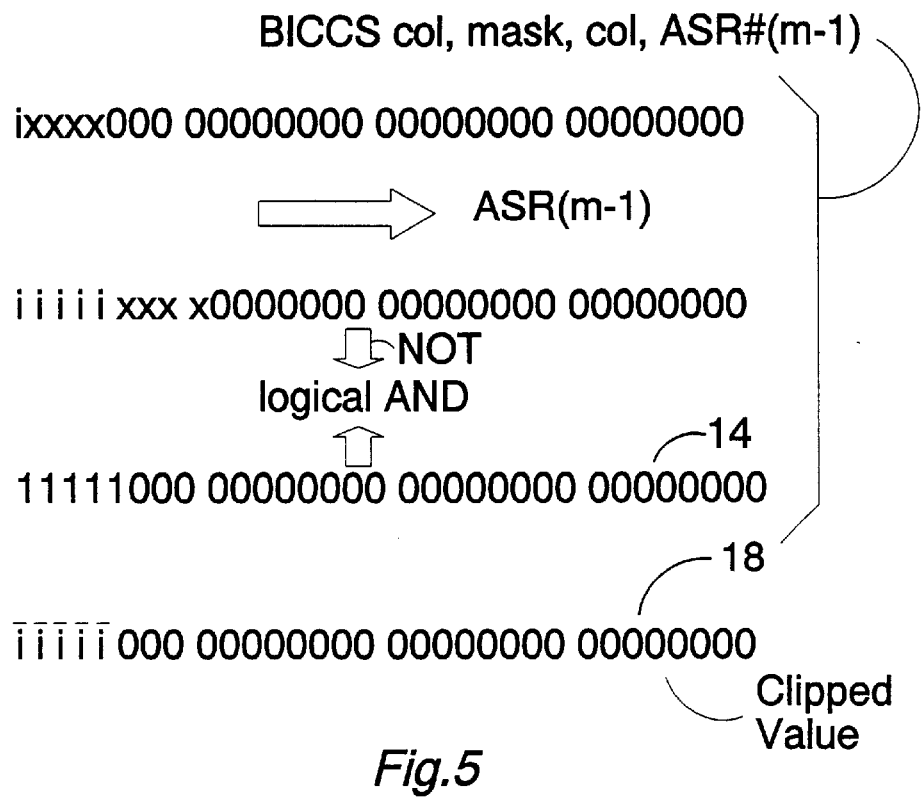
FIG. 5 illustrates a bit clear operation.
Figure 6:
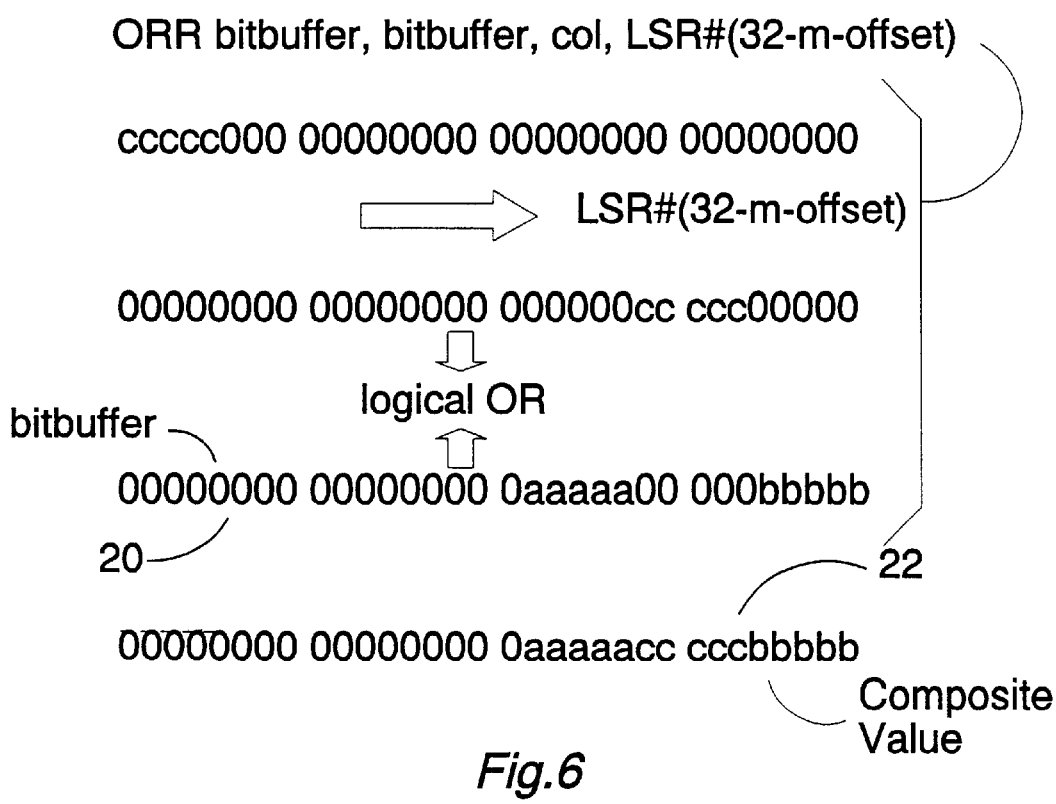
FIG. 6 illustrates a logical OR operation for assembling a composite value.

FIGS. 4, 5 and 6 illustrate three data processing instructions from the ARM instruction set. These data processing instructions execute on a general purpose processor, such as the ARM9 processor produced by ARM Limited of Cambridge, England.

FIG. 4 illustrates a logical AND instruction incorporating a logical left shift of the input unclipped data value. The input data value 10 comprises a k-bit number (in this case 8-bit) preceded by an overflow bit y. The bits of higher order than the overflow bit y are sign bits s. The k-bit number is to be quantized as well as saturated. After quantization, the desired clipped and quantized value will be an m-bit number (in this case 5-bit) and these bits are represented by x. The bits that will be removed by the quantization are represented by q.

The input unclipped data value is logical left shifted by an amount (32-k) that serves to place the most significant bit of the m-bit number into the most significant bit position. The overflow bit y is the last bit to overflow from the number due to the logical left shift and so serves to set the value of a carry flag.

The left shifted but unquantized value 12 is then subject to a logical AND operation with a mask value 14. The mask value 14 has its most significant five bits set to 1 with the remaining bits set to 0. This has the affect of keeping the desired bits x of the m-bit number and removing the unwanted bits q.

It will be appreciated that the left shifting operation and the logical AND take place in response to a single instruction. Within a general purpose processing unit the shifting may be performed at high speed using a barrel shifter and the logical AND operation performed in the arithmetic logic unit of the processor. The result of the first instruction illustrated in FIG. 4 is the left shifted value 16 with the carry flag set in dependence upon the overflow bit y.

FIG. 5 illustrates a second instruction in the form of a bit clear instruction. The second instruction is conditionally executed in dependence upon the value of the carry flag from the instruction illustrated in FIG. 4. If the carry flag indicates that the overflow bit y was a 1, then the bit clear instruction executes. If the carry flag indicates that the overflow bit y was a 0 then the bitclear instruction is not executed.

The first part of the bit clear instruction is an arithmetic right shift by (m−1) places. An arithmetic shift is one that preserves the sign of a number. Accordingly, if the most significant bit of the number is a 0, then the resulting number will be padded at the top with 0s. Conversely, if the most significant bit is a 1, then the result will be padded at the top with 1s (a logical shift always pads with 0s). The most significant bit of the left shifted value 16 in the case where an overflow has occurred indicates whether the value should be saturated high or low. This indicator bit i is propagated to the right by the arithmetic right shift to fill the most significant m bits of the input operand.

The indicator bit i in practice has the opposite value to that which is ultimately desired in the saturated output, i.e. the indicator bit will be 0 when the desired saturated output value is 11111 and the indicator bit is 1 when the desired output value is 00000. A second part of the bit clear operation deals with this inversion and removes the unwanted right shifted bits x from the saturated value using a logical AND NOT operation. Accordingly, the complement of the indicator bit i is ANDed with the corresponding bits within the mask value 14. In this way, if the five indicator bits i are 0s, then the output clipped value will have its most significant five bits as all 1s. Conversely, if the five indicator bits i are 1s, then the output clipped value will have its most significant five bits as 0s. It should be noted that the mask value 14 is reused in this bit clear operation without requiring any further manipulation or registers to store it.

As previously mentioned it will also be appreciated that the bit clear operation illustrated in FIG. 5 takes place in response to a single instruction utilising different portions of a central processing unit. The output of the bit clear operation is the clipped value 18 that has also been quantized.

FIG. 6 illustrates how a clipped value that is a component value of a composite signal may be combined with other component values. This is achieved using a logical OR instruction in combination with a logical right shift. If the component value to be combined is ccccc, then the logical right shift first aligns that component value to an appropriate bit position within the desired composite output value. The aligned component value can then be combined into the composite value using a logical OR operation. In the case illustrated the value 20 stored within a bit buffer already contains the components aaaaa and bbbbb from previous clipping and quantization operations. These previously determined components are respectively aligned at the extreme ends of the composite value with the middle portion being all 0s and available for the newly clipped and quantized component value ccccc. The logical OR operation combines the new component value ccccc into the composite value to produce a composite result 22.

Figure 7:
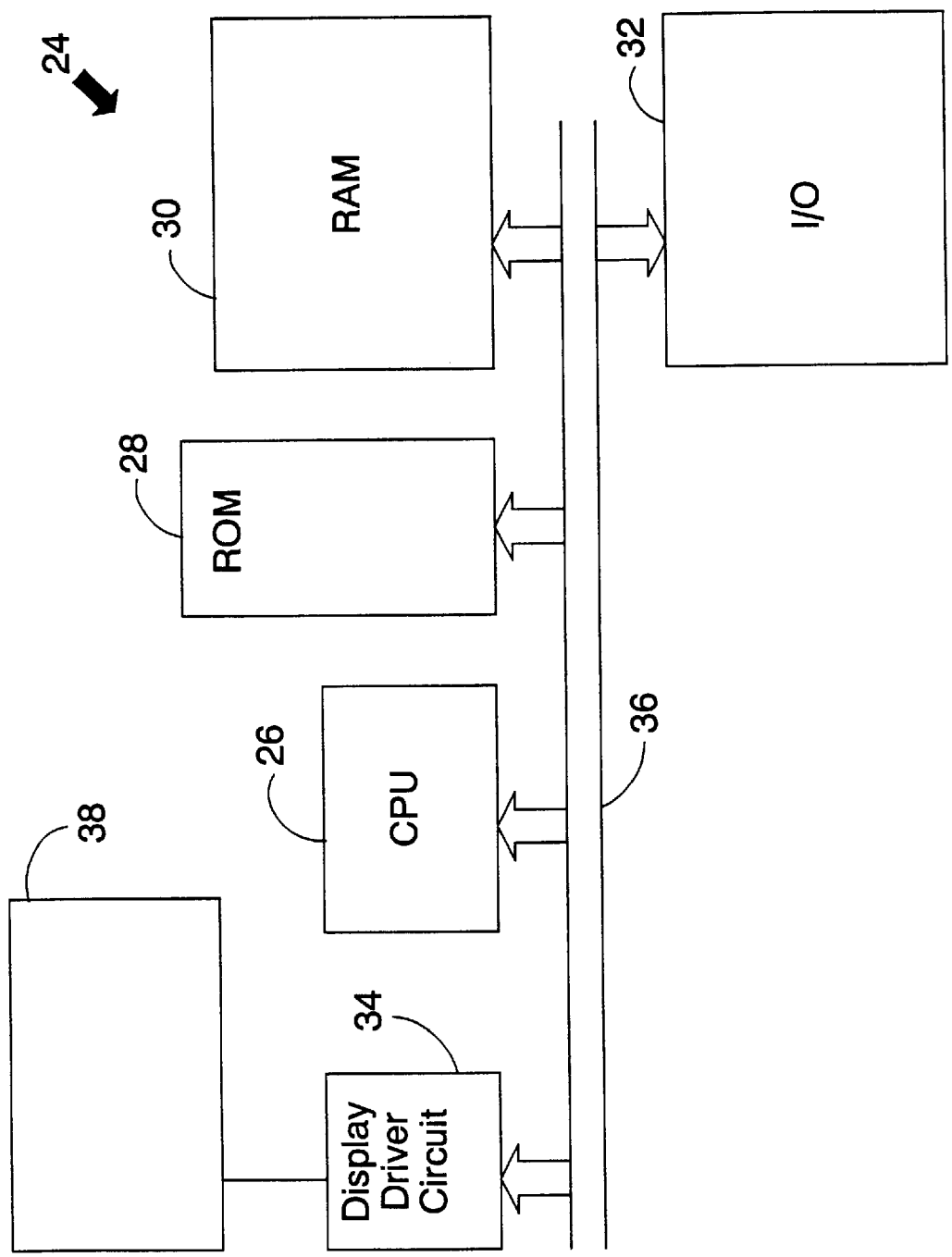
FIG. 7 illustrates a general purpose data processing apparatus which may embody the techniques of the invention.

FIG. 7 schematically illustrates a data processing system 24 including a general purpose processing unit 26 that operates under software control. The data processing system 24 includes the processing unit 26, a read only memory 28, a random access memory 30, an input/output unit 32 and a display driver unit 34 all linked by a common bus 36. A display panel 38 is driven by the display driver unit 34.

The read only memory 28 stores software instructions that control the operation of the processor unit 26 to perform the clipping and quantization operations described above. The processing unit 26 may also perform image data decompression from JPEG data or MPEG data as part of its operation. The data that requires clipping and quantizing may be received by the input/output unit 32 via, for example, a broadcast transmission system. The random access memory 30 provides buffering for received and processed data and working memory for storing the decompressed and then clipped and quantized values.

It will be appreciated that the processing unit 26 will perform the clipping and quantizing operations described previously many millions of times when processing image data as each component value of each pixel may require clipping and quantization. The three instructions illustrated in FIGS. 4, 5 and 6 provide a highly efficient way of clipping and quantizing that in the case of an ARM processor may be completed in three processing cycles.

The processed data generated by the system can be used to drive the display panel 38 via the display driver circuit 34.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing an unclipped data value in a range of −0.5N to (1.5N−1) to generate a clipped data value clipped to a range of 0 to (N−1), where N is $2^m$, said unclipped data value is represented by an overflow bit followed by an m-bit number extending from an $(m-1)^{th}$ bit to a $0^{th}$ bit and said unclipped data value is part of an n-bit twos complement input data word, said apparatus comprising:

left shifting logic for left shifting said unclipped data value to generate a left shifted data value in which said $(m-1)^{th}$ bit is a most significant bit in said left shifted data value and a carry flag is set in dependence upon said overflow bit;

saturated value generating logic for generating said clipped data value in accordance with:

said clipped data value is 0 if said carry flag indicates that said overflow bit was 1 and said most significant bit in said left shifted data value is 1;

said clipped data value is (N−1) if said carry flag indicates that said overflow bit was 1 and said most significant bit in said left shifted data value is 0; and said clipped data value is said m-bit number if said carry flag indicates that said overflow bit was 0.

2. Apparatus as claimed in claim 1, wherein n≧m+1.

3. Apparatus as claimed in claim 2, wherein quantization logic quantizes said n-bit input data value as part of forming said clipped data value.

4. Apparatus as claimed in claim 1, wherein said left shifting logic and said saturated value generating logic are provided by a general purpose processor unit operating under software control.

5. Apparatus as claimed in claim 4, wherein quantization logic quantizes said n-bit input data value as part of forming said clipped data value and said quantization logic is provided by said general purpose processor unit operating under software control.

6. Apparatus as claimed in claim 5, wherein said left shifting and said quantization is provided by said processor unit executing a first instruction giving a result of a logical AND operation with input operands of a logically left shifted version of said n-bit input data value and a mask value having its m most significant bits set to 1 and at least its (n−m) next most significant bits set to 0, said first instruction yielding a left shifted and quantized intermediate value.

7. Apparatus as claimed in claim 6, wherein generation of said clipped value is provided by said processor unit conditionally executing a second instruction if said carry flag indicates said overflow bit is 1, said second instruction giving the result of a bit clear operation with input operands of an arithmetically right shifted by (m−1) bit positions version of said left shifted and quantized intermediate value and said mask value, said bit clear operation giving a result of said mask value AND NOT said arithmetically right shifted by at least (m−1) bit positions version of said left shifted and quantized intermediate version to yield said clipped value.

8. Apparatus as claimed in claim 4, wherein said clipped value is a component value that is combined with other component values by said processor executing a logical OR operation with input operands of a logically right shifted version of said clipped value and said other component values to yield a composite value, said logical right shifting being by an amount such that said component values do not overlap in said composite value.

9. Apparatus as claimed in claim 1, wherein said unclipped data value is an image data value.

10. Apparatus as claimed in claim 9, wherein said image data value is a component image data value.

11. Apparatus as claimed in claim 1, wherein said unclipped data value is derived from a decompressed data value obtained following a lossy compression process.

12. Apparatus as claimed in claim 11, wherein said decompressed data value is obtained from JPEG data.

13. Apparatus as claimed in claim 11, wherein said decompressed data value is obtained from MPEG data.

14. Apparatus as claimed in claim 1, wherein N is 256 and m is 8.

15. Apparatus as claimed in claim 1, wherein N is 32 and m is 5.

16. A computer program storage medium bearing a computer program for controlling a data processing apparatus to perform a method of processing an unclipped data value in a range of −0.5N to (1.5N−1) to generate a clipped data value clipped to a range of 0 to (N−1), where N is $2^m$, said unclipped data value is represented by an overflow bit followed by an m-bit number extending from an $(m-1)^{th}$ bit to a $0^{th}$ bit and said unclipped data value is part of an n-bit twos complement input data word, said method comprising the steps of:

left shifting said unclipped data value to generate a left shifted data value in which said $(m-1)^{th}$ bit is a most significant bit in said left shifted data value and a carry flag is set in dependence upon said overflow bit;

generating said clipped data value in accordance with:

said clipped data value is 0 if said carry flag indicates that said overflow bit was 1 and said most significant bit in said left shifted data value is 1;

said clipped data value is (N−1) if said carry flag indicates that said overflow bit was 1 and said most significant bit in said left shifted data value is 0; and said clipped data value is said m-bit number if said carry flag indicates that said overflow bit was 0.

17. A method of processing an unclipped data value in a range of −0.5N to (1.5N−1) to generate a clipped data value clipped to a range of 0 to (N−1), where N is $2^m$, said unclipped data value is represented by an overflow bit followed by an m-bit number extending from an $(m-1)^{th}$ bit to a $0^{th}$ bit and said unclipped data value is part of an n-bit twos complement input data word, said method comprising the steps of:

left shifting said unclipped data value to generate a left shifted data value in which said $(m-1)^{th}$ bit is a most significant bit in said left shifted data value and a carry flag is set in dependence upon said overflow bit;

generating said clipped data value in accordance with:

said clipped data value is 0 if said carry flag indicates that said overflow bit was 1 and said most significant bit in said left shifted data value is 1;

said clipped data value is (N−1) if said carry flag indicates that said overflow bit was 1 and said most significant bit in said left shifted data value is 0; and said clipped data value is said m-bit number if said carry flag indicates that said overflow bit was 0.

* * * * *